Jan. 12, 1960 W. P. CRISE 2,920,584
FLUID CONTROLLER AND METHOD
Filed May 26, 1949 2 Sheets-Sheet 1
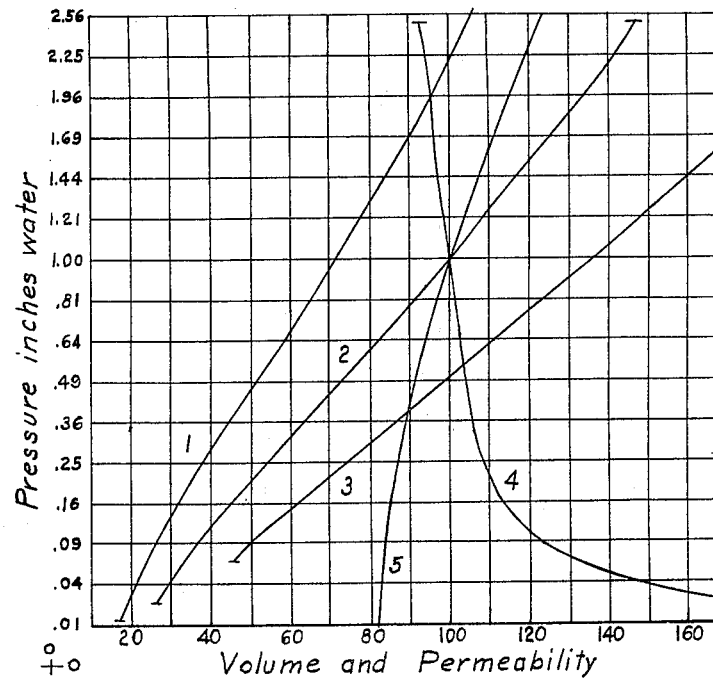
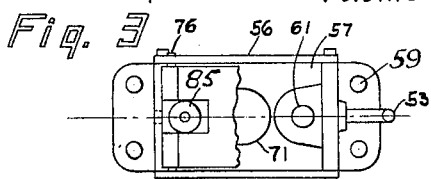
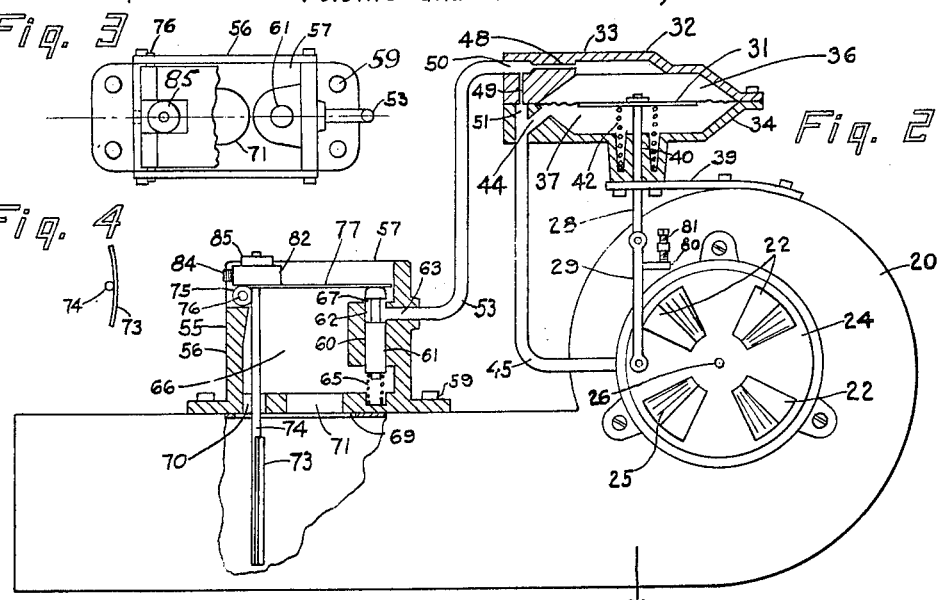
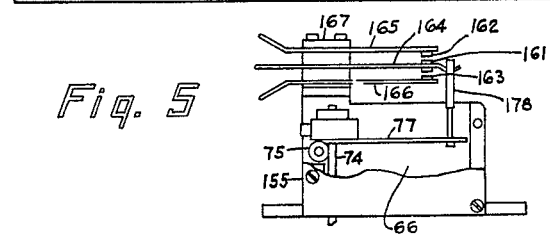
INVENTOR.
Wilford P. Crise
BY
Schmieding, Hittson and Gerber
his Attorneys Jan. 12, 1960     W. P. CRISE     2,920,584
FLUID CONTROLLER AND METHOD
Filed May 26, 1949     2 Sheets-Sheet 2
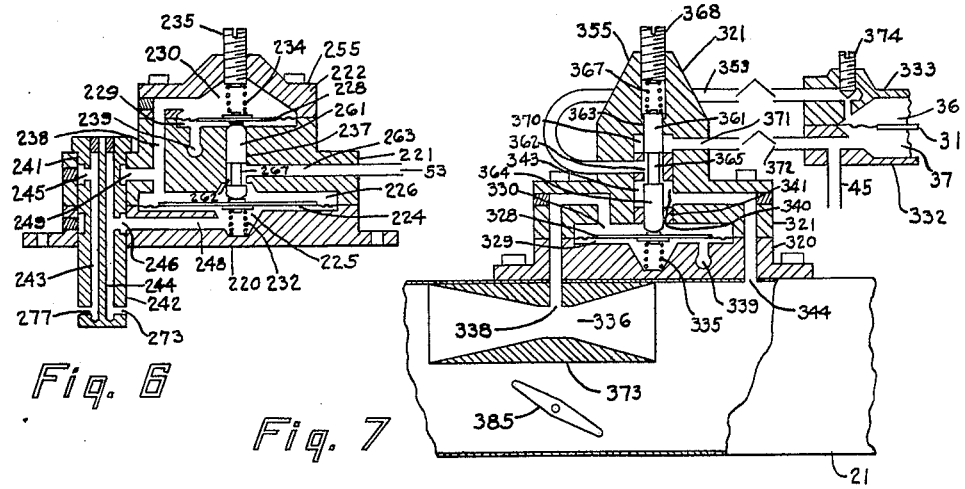
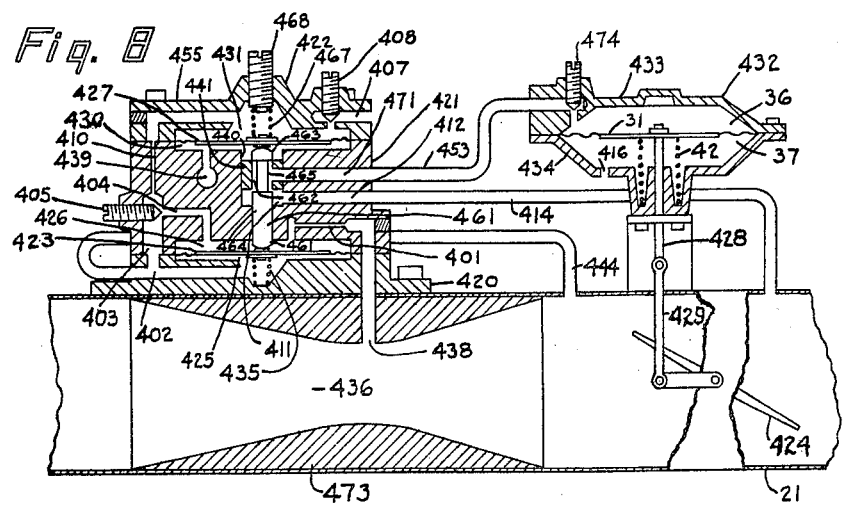
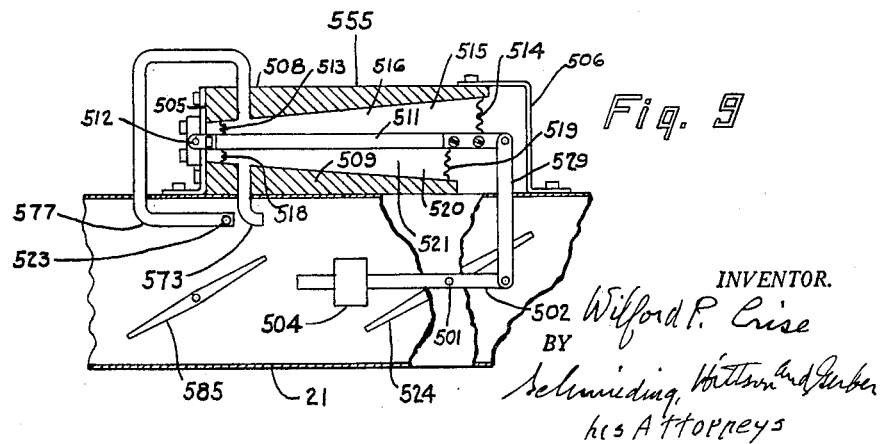

United States Patent Office 2,920,584
Patented Jan. 12, 1960

2,920,584

FLUID CONTROLLER AND METHOD

Wilford P. Crise, Columbus, Ohio

Application May 26, 1949, Serial No. 95,539

5 Claims. (Cl. 110—72)

The present invention relates to methods of and apparatus for controlling the flow of fluid against variable resistances and more particularly to methods and apparatus for automatically increasing and decreasing the volume of fluid flow against increasing and decreasing resistances, respectively.

Although the invention is applicable to many systems in which the resistance to fluid flow is variable, I have chosen to illustrate the same in connection with a stoker fired furnace and utilize the invention to maintain the fuel bed in the furnace in proper condition for most efficient combustion of the fuel.

In its broadest aspect, it is an object of the present invention to provide a method of and apparatus for varying the flow of fluid by varying the quantity of fluid flow in accordance with the resultant force of the opposing forces produced by the pressure and the velocity of the fluid being controlled.

In some forms of the invention when it is to be applied for increasing and decreasing respectively the volume of fluid in accordance with increase and decrease of the resistance to the flow of fluid, I utilize the resultant of the increasing and decreasing forces, respectively, produced by the opposing pressure and velocity of the fluid being controlled to increase the volume of fluid flow when the resistance to its flow is increased and decreasing the volume of fluid flowing when the resistance to the flow is decreased.

In some systems in which the volume of fluid is to be controlled, it is desirable to slowly increase the volume of fluid flowing, for example, at the start of a cycle of operation of the system, gradually increasing the volume to that desired, and then at the end of the phase of operation of the system, the volume of fluid flow is gradually decreased. For example, during the idle period of a stoker fired furnace, that is, when no coal is being delivered to the fuel bed, combustion continues at a low rate and after a prolonged idle period, the resistance of the fuel bed may be very low. Now if the amount of air for supporting combustion is delivered in too great volume, fly ash will be blown over the furnace surfaces to reduce the efficiency of the furnace and if this amount is sufficiently high and the resistance of the fuel bed is quite low, the volume of air delivered may be sufficient to extinguish the fire. Quite often the fly ash is blown out of the chimney and sufficient pressure may be developed to blow smoke and fly ash around the edges of the fire door and into the furnace room.

The present invention contemplates the gradual increase of the flow of fluid at the starting phase of the cycle of operation or the gradual reduction in the volume of fluid flow at the end of that phase. In the use of the invention with a stoker fired furnace, both the gradual increase in volume and the decrease in volume of fluid flow are utilized, respectively, at the starting and stopping of the delivery of fuel to the fire bed. The reducing of the amount of air delivered at the end of the phase is advantageous in a stoker fired furnace because it slowly allows for gradually reducing the natural draft while the fuel bed is cooling down.

During normal stoker operation, the resistance of the fuel bed may be reduced due to the feeding of coarser fuel, or the shrinkage of coke away from the tuyeres, or the formation of blow holes and the like. The resistance of the fuel bed may increase due to the feeding of finer coal, or the coking of the coal, or the accumulation of clinkers and ash and for other reasons. When the resistance of the fuel bed is reduced, during normal operation, it is desirable for most efficient operation, to reduce the volume of air delivered to the fuel bed. Likewise when the resistance of the fuel bed increases, during normal operation, it is desirable for most efficient operation, to increase the volume of air delivered to the fuel bed. In accordance with the present invention I utilize the resultant force of the opposing forces produced by the pressure and the velocity of the air, flowing to the fuel bed, to vary the quantity of air flowing to the fuel bed.

Instruments which are responsive to the resultant force of the opposing forces of the pressure and velocity must be highly sensitive to slight changes in pressure or velocity or both, and are, therefore, delicate and impractical for directly controlling the main fluid valve. In the present invention, I contemplate using the pressure-velocity responsive mechanism merely as a relay for controlling sturdier mechanism which latter in turn controls the heavier mechanism to be controlled.

The present invention is adaptable to many forms of systems in which the flow of liquids or gases against variable resistances and I have merely utilized the stoker system to illustrate one use of the invention.

Further objects and advantages of the present invention will be apparent from the following description, reference being had to the accompanying drawings wherein preferred forms of embodiments of the invention are clearly shown.

In the drawings:

Fig. 1 is a chart showing performance curve characteristics of the embodiment of the invention shown in Figs. 2, 3 and 4;

Fig. 2 shows, in section, one form of the invention applied to the blower and the pressure feed duct leading from the blower to the furnace of a stoker fired furnace. In this embodiment, a pressure sensitive vane, which is responsive to the pressure of the air in the duct, is counteracted by a vane which is responsive to the velocity of the air flowing in the duct to control a relay air valve;

Fig. 3 is a top plan view of the relay showing part of the pressure sensitive vane broken away;

Fig. 4 is a top plan view of the velocity sensitive vane;

Fig. 5 is a side view of a relay similar to that shown in Fig. 2 but which is utilized as an electric relay;

Fig. 6 is a view in section of a modified form of the invention in which a Pitot tube or Pitot tubes are utilized;

Fig. 7 shows another form of my invention in section in which a Venturi tube is utilized for controlling the relay in response to the velocity of the air flowing;

Fig. 8 is another form of the invention employing a Venturi tube; and

Fig. 9 is a further embodiment of the invention employing Pitot tubes.

Referring first to the embodiments shown in Figs. 2, 3 and 4, there is shown a fluid pump in the form of an air blower 20, the outlet of which is connected with an air duct 21. The blower 20 is of the Sirocco type whose inlet is in the side of the blower and includes a plurality of radially extending openings 22. The amount of air taken into the blower is controlled by a valve plate 24 having a plurality of radially extending openings 25. The valve plate 24 is rotatably mounted at the axis 26. The valve plate 24 is rotated by a rod 28 through a link 29.

Axial movement is imparted to the rod 28 by a diaphragm 31 of the main valve actuator 32. The valve actuator 32 comprises a casing including top and bottom side members 33 and 34, respectively. The peripheral edge of the diaphragm 31 is clamped between the side members 33 and 34 and divides the casing into an upper chamber 36 and a lower chamber 37. The valve actuator is carried by a bracket 39 which is suitably secured to the top of the blower 20. A hollow boss 40 in the casing side 34 provides a guide for the reciprocating rod 28. A spring 42 is interposed between the bottom of the diaphragm 31 and the top side of the side 34 and is biased to normally urge the diaphragm 31 and the rod 28 and link 29 upwardly so that the valve plate 24 closes the openings 22 in the blower.

The lower chamber 37 is provided with a passageway 44 which is connected by a tube 45 to the inlet side of the blower intermediate the fan therein and the inlet openings 22 so that when the blower is started, a partial vacuum is created in the lower chamber 37. The upper side casing 33 is provided with two restricted passageways 48 and 49, connected with one another through a third passageway 50. Passageway 49 is connected with passageway 44 through a passageway 51. As the differential in pressure increases between upper chamber 36 and lower chamber 37 by the reduction in pressure in chamber 37, the diaphragm 31 will overcome the tension of spring 42 and move rod 28 and link 29 downwardly to open the valve which controls the flow of air to the blower whereby the volume of air flowing to air duct 21 is increased. The speed of downward movement of the diaphragm 31 is controlled by controlling the amount of air passing through the restricted orifice or passageway 48 and this in turn is controlled by the amount of air admitted to passageway 50.

Passage 50 is connected with a tube 53 and this tube in turn is connected with the relay 55. Relay 55 comprises a casing 56 which is open at the top as shown at 57. Casing 56 is connected to the top side of duct 21 by screws 59. A valve guide 60 is formed integrally with one of the side walls of the casing 56 to provide, at its lower end, a valve guide for a piston type valve 61 and, at the upper end, a passageway 62 for air. Passageway 62 is connected by a passageway 63 which in turn is connected with the tube 53. A coil spring 65 is interposed between the bottom of the valve 61 and the bottom of casing 56 and normally urges the valve upwardly for permitting the flow of air from the interior of the casing 66 to the passageway 62, the valve 61 having a reduced or neck portion 67 within the passageway 62. Passage 50, tube 53, passageway 63, passageway 62, and interior of casing 66 form an overall fluid passageway connecting the expansible chamber motivating mechanism or valve actuator 32 with the air duct 21. This fluid passageway is thus a control circuit for the motivating mechanism. Inasmuch as air duct 21 is under a greater pressure than the space between blower inlet control valve plate 24 and the pump or air blower 20 when the pump or air blower 20 is operating, said duct 21 is a source of power for the motivating mechanism 32, said space being connected by tube 45 with the lower chamber 37 and through the restricted passages 48 and 49 with the upper chamber 36.

An opening 69 in the upper part of the duct 21 registers with two openings 70 and 71 in the bottom of casing 56 so that free air intercommunication is established between the duct 21 and the interior 66 of the casing.

A velocity responsive vane 73 is disposed within the duct 21 and is therefore responsive to the impact head, which is herein referred to as dynamic pressure, of the fluid flowing through the duct. Vane 73 is carried by lever arm 74 of a bell crank lever 75 which is pivotally mounted on a pin 76. The other arm 77 of the bell crank lever 75 extends horizontally and is in the form of a wide paddle which substantially spans the top of casing 56 and forms a pressure vane. This pressure vane 77 rests upon the top of piston valve 61.

The bell crank lever arms 74 and 77 are moved clockwise upon increase in velocity of the air flowing through duct 21 and, when moved clockwise, the piston valve 61 is moved downwardly against the tension of spring 65 to decrease the flow of air from the chamber 66 to the valve chamber 62. Obviously, on counterclockwise movement of the bell crank lever 75, the spring 65 urges valve 61 upwardly to increase the amount of air flowing from chamber 66 to valve chamber 62. The force exerted by the velocity of the air is opposed by the pressure within chamber 66 since the pressure in chamber 66 is exerted against the underside of the pressure vane or lever arm 77. Thus it is apparent that the amount of air flowing from chamber 66 to valve chamber 62 is responsive to the resultant force of the opposing forces produced by the pressure of the air in the duct 21 and the velocity of the air in said duct.

When the air is dormant in duct 21, the spring 65 normally urges the valve 61 to its open position so that air can pass from chamber 66 through valve chamber 62, passage 63, tube 53 and passage 50 to restricted orifices 48 and 49 which lead respectively to chamber 36 and chamber 37.

The speed at which the valve plate 24 opens the openings 22 to the inlet of the blower is controlled by the amount of resistance offered by orifice 48. By increasing or decreasing the resistance offered by orifice 48, the speed at which the valve plate 24 is rotated to open position can be controlled. In other words, if the orifice is enlarged, more air will be withdrawn through the tube 53 and the diaphragm will move downwardly faster and conversely the reverse happens if the orifice 48 is further restricted.

As the flow of air gradually increases in duct 21, due to the valve plate 24 gradually opening, the air flow past velocity vane 73 develops an increasing force approximately proportional to the square of the velocity of air flowing past the vane 73, with the result that the vane 73 is urged to the left tending to move valve 61 downwardly, decreasing the flow of air from duct 21 to chamber 36 in the main valve actuator 32. However, since the fuel bed offers resistance to the passage of air, an increasing static pressure develops in duct 21 as the flow of air increases and since the chamber 66 is in communication with the duct 21, a substantially similar pressure develops under pressure vane 77 urging the latter upwardly augmenting the force of spring 65 and resisting the moving force by the velocity vane 73. It should be noted that the top of pressure vane 77 is open to the atmosphere, and therefore the pressure above the vane is less than the pressure below the vane by substantially the same amount that the pressure outside duct 21 is below the pressure inside the duct.

As the flow of air in duct 21 continues to increase as valve plate 24 slowly opens, the force produced by the air flowing past velocity vane 73 will finally overbalance the air pressure acting against the underside of pressure vane 77 and the resistance offered by spring 65 and move balanced piston valve 61 downwardly to reduce the amount of air entering valve chamber 62 and consequently reducing the amount of air entering chamber 36 of the main valve actuator 32. Since restricted passage 49 allows some air to flow from tube 53 to tube 45, the downward movement of diaphragm 31 will cease when the amount of air entering valve chamber 62 equals the amount flowing through passage 49, and, to maintain the diaphragm stationary, the air entering valve chamber 62 must be exactly equal to that flowing through the restricted passage or orifice 49. Obviously, the piston valve 61 must be in exactly the right position for valve 24 to be stationary and a very slight movement of valve 61, from this position, will cause movement of the diaphragm 31 and valve 24. Should the amount of air entering valve chamber 62 be greater than that flowing through restricted orifice 49, valve 24 will open further, or, if the air entering the valve chamber 62 is less than that flowing through orifice 49, the difference will be supplied from chamber 36 through orifice 48, and, in that event, diaphragm 31 will move upwardly under the urging of spring 42 to move the valve 24 toward the closed position.

After valve 24 has been moved to the position where the force produced by the air, flowing past velocity vane 73, balances the force produced by the static pressure in duct 21, where valve 61 permits the same amount of air to enter passageway 62 as that which flows through orifice 49, any change in fuel bed resistance will tend to cause an unbalancing. Should the fuel bed resistance increase, the flow of air past velocity vane 73 will be decreased and the pressure against pressure vane 77 will be increased. This will cause piston valve 61 to move upwardly, increasing the flow of air to valve chamber 62 with the result that valve 24 will be moved to gradually open further and this will continue until the velocity of the air flowing past velocity vane 73 increases to the point where a new balance is established at a greater rate of flow. Should the fuel bed resistance decrease, the flow of air past velocity vane 73 will be increased and the pressure against pressure vane 77 will be decreased. This will cause piston valve 61 to be moved downwardly, decreasing the flow of air to chamber 36, resulting in valve 24 moving toward closed position until a new balance is established at a lesser rate of flow through the duct 21.

When the blower and stoker are stopped at the end of an operating phase, the pressure in both tubes 45 and 53 will quickly return to the atmospheric level. Valve 24, however, will close slowly since the restricted passage or orifice 48 will impede the escape of air from chamber 36. Obviously, the restriction offered by orifice 48 can be varied so that it will take anywhere from two seconds to several minutes for valve 24 to close. This impeding will allow a gradually reduced natural draft to flow through the duct 21 to the fuel bed, to carry away the burned gases while the fire is cooling down. Suitable stops can be provided to prevent the complete closing of valve 24, or, valve 24 could be built with some leakage to provide the desired amount of natural draft while the stoker is idle. Such stops are shown at 80 and 81, the stop 81 being a screw which is adjustable vertically.

The relay 55 can be adjusted so as to maintain the desired thickness of the fuel bed. To accomplish this, the stoker is permitted to operate until it has had time to establish the fuel bed resistance for which it had been temporarily adjusted. Then the fuel bed is examined and if it is found to be too thin, the vane is turned so that the plane thereof is more nearly at right angles with the axis of the duct 21. If the fuel bed is found to be too thick, the vane is turned until it offers less resistance to the flow of air flowing through the duct 21. The lever arm 74 is in the form of a rod which extends through a support block 82 of the bell crank lever 75 and the rod and vane are held in adjusted position by a set screw 84. A collar 85 is permanently secured to the rod 74 and it is utilized as the turning element for the rod when the set screw 84 is loosened. Suitable indicia can be placed upon the collar or knob 85 to indicate the relative angle of the vane with respect to the axis of the duct 21.

Fig. 1 shows the test curves of the control apparatus shown in Figs. 2 to 4. The data for these curves were obtained by using more than sufficient stabilizing bias to produce complete stability of operation. This bias was furnished by spring 65 and was equivalent to about .085 inch of pressure on pressure vane 77 in securing the data for curves 1 to 4. In making these tests, the fuel bed was simulated by a metal plate having numerous small holes mounted in an expanded section which was positioned across the discharge end of an air duct. By means of plugs for opening or closing these holes, any desired resistance to the flow of air was readily obtained and could be easily duplicated.

Referring to Fig. 1, each horizontal space represents 10% increments in volume, 100% being the flow of air at one inch pressure as shown by curve 2 and being about 60 cubic feet per minute. The same scale is used to indicate the permeability of the relative number of holes in the discharge plate, 100% corresponding to the number of holes open at one inch pressure and 100% volume as referred to in curve 2. The vertical spaces represent pressure as noted, the values being so chosen that even spaces represent even steps of the square root of the pressure such as .01 whose square root is .1, .04 whose square root is .2, .09 whose square root is .3, and so up to 2.56 whose square root is 1.6. These values were chosen because, with a constant resistance, volume of flow is substantially proportional to the square root of the pressure. In preparing these curves, the relative volume was determined by multiplying the number of open holes in the discharge plate by the square root of the pressure available to produce discharge and by a constant.

Curve 1 shows the relation between pressure and volume as controlled by the control mechanism shown in Figs. 2 to 4, with velocity vane 73 set with its plane at right angles to the axis of duct 21, as shown in Figs. 2 and 4. Curve 2 shows the performance of the same mechanism, wherein velocity vane 73 was rotated slightly from the position of curve 1. Curve 3 shows the performance of the same control mechanism wherein velocity vane 73 was rotated still further from the right angle plane of the axis of the duct 21. Curve 4 is a companion curve to curve 2 and shows the permeability of the discharge plate or the relative holes open in it, corresponding to the same pressures and volume as curve 2. If a straight edge is placed so that its edge coincides with the point of zero pressure and zero volume and with the mid-point of curves 1, 2 or 3, it will be seen that these curves coincide quite closely with the line of the straight edge which defines a curve where volume is equal to the square root of the pressure and the constant. Since volume, changing in proportion to the square root of the pressure, is the maximum rate volume can change with relation to the pressure even with constant resistance, it can be seen that curves 1, 2 and 3 show that this control mechanism is capable of regulating fluid flow against variable resistance at very near to the maximum possible rate. It is to be noted that curves 1, 2 and 3 agree equally well with the theoretical maximum, indicating that the operating characteristics of this means is unaffected by the volume adjustment. An examination of curve 4 will show that over a normal working range, a small change in fuel bed resistance produces a large change in volume, a change of permeability from 105 to 95 percent in fuel bed resistance, producing a change in volume of more than two to one.

A mathematical analysis of curves 1, 2 and 3, shows that their formula is approximately: Volume is equal to the square root of (pressure plus .085) times the constant. The constant for curve 1 being 66.8, for curve 2 being 94.6 and for curve 3 being 129.2. The biasing force .085, supplied by spring 65, could be reduced to about .05 and still have stable operation. A change in rate, at which volume increases with an increase in pressure, can be made by changing the ratio between the effectiveness of pressure vane 77 and biasing spring 65. Curve 5 is a calculated curve showing a change of this kind. Its formula is: Volume is equal to the square root of (pressure plus 2.0) times 57.74. The constant 57.74 was used in order to make the volume 100 at a pressure of one inch.

Should it be desired to make the change in volume follow a different formula at one pressure range than another, auxiliary biasing springs, pressure vanes or velocity vanes may be provided that could be brought into operation over any desired pressure range. For example, if a biasing spring having a bias of three inches was used, and an auxiliary spring one-third as strong was provided, to oppose the biasing spring, with an auxiliary pressure operated vane of equal capacity to the pressure vane arranged to disengage the auxiliary spring with rise in pressure, a bias of one inch would be effective below one inch of pressure and a bias of three inches above that pressure. It will be apparent from the above that pressure vane 77 comprises means for sensing the static pressure in the duct, and that the diaphragm 31, the rod 28 and the link 29 constitute damper operating means which are operated by the sensing means 77 through the relay valve 60, 61, 62 and the duct 53. It will also be apparent that the velocity responsive vane 73 comprises means for sensing the dynamic pressure in the duct 21 and is responsive to velocity of air passing through the duct 21 for opposing the operation of the static pressure sensitive means 77 and through it, opposing the operation of the damper operating means 31. It is also clear that the force produced by the static pressure on the vane 77 is opposed by the force produced by the volume or flow of air through the duct acting on the vane 73.

The spring 42 is a means biasing the modulating valve 24 towards a closed position; the parts 44 and 45 constitute means for connecting the inlet side of the pump 20 to chamber 37 of the motivating mechanism 31, the chamber 37 being the chamber which when expanding reduces the passage through the modulating valve 24; and the vane 73 constitutes means connected to the device 61, and extending into the duct 21 responsive to dynamic flow through the duct 21 for closing the relay valve 60, 61, 62.

Vanes 73 and 77 are means sensitive to pressure and flow and connecting the relay 60, 61, 62 with the air duct 21 for controlling the power supplied to the motivating mechanism 31 to tend to move the modulating valve 24 toward a position in which the valve offers less resistance to the flow of air through the duct 21 whenever the static pressure is increased and to tend to move the modulating valve 24 toward a position in which the valve 24 offers greater resistance to the flow of air through the duct 21 whenever the flow of air through the duct 21 is increased.

The pump or air blower 20 constitutes means for supplying fluid under pressure connected to the duct 21 for forcing fluid therethrough; and the relay valve 60, 61, 62 constitutes means controlled by the opposed forces of static pressure of the fluid flowing through the duct 21 and the dynamic pressure of said fluid flow for causing the motivating mechanism 31 to move the modulating valve 24 toward and from a position of less resistance to fluid flow.

The valve 24 constitutes regulating means for regulating the flow of fluid through the duct 21; and the vanes 73 and 74 constitute means connected with the relay 60, 61, 62 acting under the influence of static pressure for urging the relay 60, 61, 62 to cause the regulating means 24 to effect an increased flow of fluid and acting under the influence of dynamic pressure to cause the regulating means 24 to effect a decreasing flow of fluid through the duct 21.

The vane 73 is means associated with the relay valve 60, 61, 62 so constructed that in response to the flow of fluid in said duct 21 it urges the relay valve 60, 61, 62 toward a position to cause the motivating mechanism 31 to move the modulating valve to decrease the flow of fluid through the duct; and the vane 77 is means connected with the vane 73 so constructed that in response to static pressure in said duct it urges and is capable of moving said vane 73 in the opposite direction to that in which the flow of fluid moves the vane 73.

The vane 73 is also means for subjecting the relay valve 60, 61, 62 to a force, as a result of dynamic pressure in the duct 21, tending to move the relay valve 60, 61, 62 in the direction opposite to that in which the spring 65 tends to bias it; and the vane 77 is means for subjecting the vane 73 to a force tending to and capable of moving it in the direction it is urged by the spring 65 as a result of the static pressure in the duct 21.

In the embodiment shown in Fig. 5, the relay 155 is in the form of an electric relay for controlling an electric motor for actuating the valve plate 24. It will be understood that the relay 155, in this embodiment, is substituted for relay 55 and like relay 55 is carried by the air duct 21 and is responsive to the pressure of the air in the duct 21 and also the velocity of the air in said duct. The pressure responsive vane 77 is connected by an arm 178 with a contact 161. Contact 161 is arranged so that upon upward movement thereof it will engage a contact 162 and upon downward movement thereof, engage a contact 163. Each of these contacts is carried by resilient arms 164, 165 and 166, respectively. Each of these resilient arms is insulated from one another by an insulating block 167 which block is carried on top of the relay 155. When the blower 20 is inoperative, that is, when the air is dormant in the duct 21 and at atmospheric pressure, contact 161 is in engagement with contact 162.

When relay 155 is used in connection with a control motor requiring the switching of two circuits, for example, for reversing the direction of rotation of the control motor, when contact 161 engages contact 162, the control motor will rotate in one direction, and, when contact 161 engages 163, the control motor will rotate in the opposite direction. If the control motor employs only one control circuit, contact 161 may be used in connection with either of contacts 162 or 163, depending on whether a normally closed or normally open circuit is required.

The relay 155 is particularly applicable to the control motor 1, shown in Fig. 1 of the Crise et al. Patent No. 2,230,612, issued February 4, 1941. This control motor 1 would replace the main valve actuator 32 of Fig. 2 of the instant application. The slow speed shaft 13 of said patent would be so connected with valve plate 24 of the instant application that when the circuits thereto are open, valve 24 will be opened, and, when leads 32 and 33 of the control motor are closed by the closing of contact 161 on contact 163, the control motor 1 will slowly close the valve 24. When the stoker is started and the blower 20 is brought into operation, the velocity of the air will be built up quickly and this velocity acting on the velocity vane 73, will immediately cause contact 161 to engage contact 163. The motor 1 will then immediattely start rotating in a direction to close valve 24. Valve 24, moving toward closed position, will soon reduce the air flow to a point where the velocity vane 73 will be balanced by the pressure vane 77 whereby contact 161 will be separated from contact 163 to stop the further closing of valve 24, the motor 1 will then start opening the valve 24. Changes in the fuel bed resistance causes the relay to open or close the valve plate 24 to deliver the correct amount of air to the fuel bed so as to maintain the same substantially constant.

In order to close valve 24, when the stoker is idle, a switch could be provided to short circuit the motor control leads 164 and 166 when the stoker is stopped. By using different gear ratios or various relative capacities of the fixed and wound shading screens, as described in said Patent No. 2,230,612, valve 24 could be opened and closed at any desired rate and could be opened at one rate and closed at another, if desired.

Thorough tests, of the embodiment shown in Fig. 5, similar to those made on the embodiments shown in Figs.

2 to 4, showed that the performance characteristics of the embodiment shown in Fig. 5 to be similar to those shown in Figs. 2 to 4.

In the embodiment shown in Fig. 6, the relay 255, employs two Pitot tubes. Relay 255 includes three superimposed sections 220, 221 and 222. Section 220 is mounted on top of the duct 21. A flexible diaphragm 224 is interposed between sections 220 and 221 to form a chamber 225 interposed between the lower part of the diaphragm 224 and section 220 and to form a chamber 226, with section 221 above the diaphragm. A diaphragm 228 is interposed between the top of section 221 and the bottom of section 222, to form with section 221, a chamber 229 below the diaphragm, and, to form with section 222 a chamber 230 above the diaphragm. A spring 232 is disposed within chamber 225 and is interposed between the top side of section 220 and the bottom side of diaphragm 224 and normally urges the diaphragm 224 upwardly. A spring 234 is disposed within chamber 230 and is interposed between an adjusting screw 235, in the top of section 222, and the top side of diaphragm 228 and, normally urges said diaphragm 228 downwardly. The tension of the spring 234 can be adjusted by the screw 235.

The center section 221, at its center, is drilled to form a valve guide 237 and a valve chamber 262. Valve chamber 262 is in communication with chamber 226 and is also connected with tube 53 by a passageway 263. The drilled opening extends entirely through the section 221 and a piston type valve 261 is disposed in the guideway 237. The upper end of valve 261 is engaged by the bottom side of diaphragm 228 and the bottom end of said valve is engaged by the upper side of diaphragm 224. Valve 261 is provided with a neck portion 267 to permit the flow of fluid from the chamber 226 to the passageway 263 when the valve 261 is moved downwardly to open position. Chamber 226 is connected with chamber 230 by a passageway 238.

The chamber 229 below the diaphragm 228 is connected to atmosphere through a passageway 239.

The left side of the section assemblies of sections 220 and 221 are drilled, as at 241 to receive a multiple Pitot tube fitting 242, the lower part of which extends into the duct 21. The fitting 242 is provided with two longitudinal, parallel and vertically extending bores 243 and 244 which are connected respectively with circular grooves 245 and 246 in the periphery of the tube. An inlet passage 277 and an inlet passage 273 is provided respectively for the bores 243 and 244. These passages extend horizontally, passage 273 facing the stream of air in duct 21 while passage 277 lying on the lee side of the stream of air. It is desirable that the lower end of the fitting 242 be flat and streamline in line with the openings 277 and 273 in order to increase the pressure rise due to the flow of fluid against opening 273 and in order that there be a reduction in pressure due to the air flowing past opening 277. Annular groove 246 is connected with chamber 225 by a passage 248 in section 220 and the annular groove 245 is connected with chambers 226 and 230 by passages 249 and 238.

As is well known in the operation of Pitot tubes, the pressure in opening 273 will be greater than the pressure in duct 21 and the difference will vary approximately as the square of the velocity of the air. Consequently, the pressure in bore 244 and chamber 225 will be increased substantially as the square of the velocity in the duct 21. The pressure in opening 277 will be less than the pressure in duct 21 and will be reduced approximately as the square of the velocity of the air in said duct. Thus the pressure within bore 243, chamber 226 and chamber 230 will be decreased approximately proportional to the square of the velocity of the air in duct 21.

It will, of course, be understood that the relay 255 is to be substituted for the relay 55 shown in Fig. 2. When the stoker and blower have been idle for some time, valve 24 will be closed or partly closed and valve 261 will be in the position shown. When the stoker and blower are started, and the static pressure in duct 21 is increased, air will be free to flow from duct 21 through opening 277, bore 243, passages 249 and 238 to chambers 226 and 230, and air will pass from chamber 226 through valve chamber 262, passage 263 to tube 53. As previously explained with respect to Fig. 2, the main valve actuator 32 will function to slowly open the valve 24.

The increasing of pressure within chamber 225, due to the increase in velocity of the air flowing in duct 21, will tend to close the valve 261 but this closing force is always opposed by the counteracting static pressure in chamber 226 and chamber 230. It will be observed that the area on the underside of diaphragm 224 balances the area of the upperside of said diaphragm so that the diaphragm is not affected by changes in static pressure but is responsive solely to the changes in velocity. In this respect, the diaphragm 224 functions similar to pressure vane 73 of Fig. 2. Diaphragm 228 being subjected to atmospheric air pressure on the lower side and static pressure on the top side, causes said diaphragm to function in the same manner as pressure vane 77 of Fig. 2. Spring 234 cooperates with diaphragm 228 in the same manner that spring 65 cooperates with pressure vane 77 in Fig. 2 in that they both normally urge the valve toward open position.

As the flow of air in duct 21 gradually increases, the pressure below diaphragm 224 will increase above the pressure in duct 21, as previously explained, and at the same time, the pressure above both diaphragms 224 and 228 will decrease below the pressure in duct 21. This act tends to shut off the flow of air from chamber 226 to valve chamber 262, the increasing pressure differences at openings 273 and 277 having a similar effect on diaphragms 224 and 228 that the flow of air past velocity vane 73 has on it and that the static pressure on pressure vane 77 has on it. Thus as the flow of air increases in duct 21, the increase in pressure below diaphragm 224, above the pressure in duct 21, and the decrease in pressure above diaphragms 224 and 228, below the pressure in duct 21, will finally overcome the pressure above diaphragm 228, with the result that the valve 261 will be moved upwardly reducing the flow of air to the main valve actuator 32, stopping the further opening of valve 24. Any change in fuel bed resistance, or the shutting down of the stoker, will effect the opening of valve 24 and the flow of air through duct 21, the same as explained in connection with Fig. 2.

By turning the adjusting screw 235, the bias of spring 234 can be controlled. By rotating the Pitot tube fixture 242, the relative positions of openings 273 and 277 with respect to the direction of air stream can be changed for modifying the effects thereof so as to adjust the thickness of the fuel bed to that desired.

In the embodiment shown in Fig. 7, a Venturi tube 373 is disposed in the upper part of the duct 21 and the proportion of air flowing through duct 21 that flows through the Venturi tube is controlled by a hand operated damper 385 which may be adjustably set in any desired position.

The relay 355 includes sections 320 and 321. A diaphragm 328 is interposed between sections 320 and 321 whereby the section 320 with the diaphragm 328 provides a chamber 329 and, the section 321 with the diaphragm 328 provides a chamber 330. Lower chamber 329 is connected to atmosphere through a passage 339. A coil spring 335 is interposed between the bottom of chamber 329 and the underside of diaphragm 328 and normally urges the diaphragm upwardly. The neck portion 336 of the Venturi tube 373 is connected by a passage 338 with the upper chamber 330.

As is well known, as fluid flows through the Venturi tube, pressure is changed to velocity at the restricted neck portion, producing a lower pressure at this point.

This reduction in pressure at the restricted portion is substantially proportional to the square of the increase in velocity. As the rate of air flow through duct 21 and Venturi tube 373 gradually increases, the pressure in passage 338 and in chamber 330 will be gradually decreased. The static pressure in duct 21, being in communication with the chamber 330, acts on diaphragm 328 in the same manner as the static pressure in duct 21 acts on pressure vane 77 of Fig. 2. The reduction of pressure in the chamber 330, due to the flow of air through Venturi tube 373, acts on the diaphragm 328 and affects the operation thereof in the same manner as the flow of air past velocity vane 73 affects the operation of the valve 61 of Fig. 2.

Section 321 is centrally bored, vertically, for receiving a valve guide bushing 341. Bushing 341 divides the bore 340 into a chamber 343 and a valve chamber 362. The lower chamber 343 is in communication with the duct 21 through a passage 344. Valve chamber 362 is connected by a tube 353 to the main valve regulator 333.

A piston type valve 361 having an upper and lower head portion 363 and 364 connected by a neck portion 365, is disposed within the bore of the bushing 341. The lower part of the head portion 364 bears upon the upper side of diaphragm 328 and the upper portion of head 363 engages a coil spring 367 whose tension is adjusted by an adjustable screw 368.

Valve 361 is assisted in its upward movement by the spring 335 and its upward movement is resisted by spring 367. The movement of the valve 361 controls the amount of air flowing from duct 21 to chamber 36 of the main valve actuator 332 by controlling the amount of air flowing from the chamber 343 to valve chamber 362. The upper part of the bore 340 of section 321 forms a chamber 370, which latter is connected by a passage 371, and a tube 372 with the lower chamber 37 of the main valve actuator. The amount of air flowing from chamber 36 to chamber 37 is controlled by the head portion 363 of the valve 361.

If the stoker and blower have been idle for sometime, valve 24 will be closed or substantially closed and the relay valve 361 will be in a position shown. When the stoker and blower are started, air will be free to flow from duct 21 through passage 344, chamber 343, valve chamber 362, tube 353 to actuator valve chamber 36. As shown in Fig. 2, valve chamber 37 is connected to the inlet side of the blower by tube 45. Valve 24 of the blower will gradually open and the speed at which the valve 24 is opened is controlled by adjusting the amount of air flowing from the tube 353 to upper valve chamber 36. In the instant disclosure, the amount of air flowing is controlled by a restrictor in the form of an adjustably-set screw 374. As the rate of air flow through duct 21 and Venturi tube 373 gradually increases, the bias of spring 367 is gradually overcome with the result that valve 361 will move upwardly, restricting the flow of air from lower chamber 343 to valve chamber 362. This will stop the further opening of the main valve 24 and stop the increase in the flow of air through the duct 21. If the fuel bed resistance increases, the static pressure increases and the velocity decreases, resulting in the lowering of valve 361 to permit the flow of air from duct 21 to the upper main control valve 332, to further open the main valve 24. This causes an increase flow of air and the increase will continue until the valve 361 is again moved upwardly to establish a new balance.

The relative amount of air flowing through Venturi 373 can be adjusted by changing the postion of the damper 385. By adjusting the position of damper 385, the normal thickness of the fuel bed can be controlled. Like relay 55 of Fig. 2, relay 355 will cause a large increase in flow through duct 21 when there is a small increase in fuel bed resistance and will cause a large decrease in flow when there is a small decease in fuel bed resistance. During normal operation, when a balance has been established between the rate of air flow and fuel bed resistance, unless the fuel bed resistance changes quickly, control valve 361 will move but a very small amount in maintaining the desired balance between the fuel bed resistance and the volume of air supplied to the fuel bed. At the point of balance, valve 361 will stand at a position where there will be a small flow of air from lower valve chamber 343 to valve chamber 362 and an equal flow of air from chamber 362 to upper chamber 370. At this time, no air flow will take place between chambers 36 and 37 of the main control valve. When the valve 361 is in this position, a very small movement of said valve will start the flow of air in tube 353 in one direction or the other and the corresponding opening or closing of the main valve 24.

It has been found in actual tests that if the relay 355 and the damper 385 are properly adjusted, curves almost identical to those of Fig. 1 could be drawn from the data obtained.

It will be understood that the screw 374 can be adjusted to vary the length of time at which the main valve 24 is moved from substantially closed to substantially open position and vice versa.

In the embodiment shown in Fig. 8, the relay 455 comprises three sections 420, 421 and 422. A flexible diaphragm 423 is interposed between sections 420 and 421, to provide with said sections, lower chamber 425 and a chamber 426. A flexible diaphragm 427 is disposed between the upper part of section 421 and the lower part of section 422 and provides with said sections a lower chamber 430 and an upper chamber 431. A spring 435 is disposed in chamber 425 and engages the bottom side of the diaphragm 423 to normally urge the latter upwardly. A spring 467 rests upon the top of diaphragm 427 and bears against a screw 468; this screw 468 may be adjustably set for regulating the tension of spring 467.

A Venturi tube 473 spans the duct 21 and the restricted portion 436 thereof is connected by a passage 438 and a restricted passage 401, in section 421, with chamber 426. The lower chamber 425 is connected to the main duct intermediate the main valve 424 and Venturi 473 by a tube 444 and passage 402. Chambers 425 and 426 are connectible with one another through passages 402, 403 and 404. Passage 404 may be restricted or closed by a screw 405. Chamber 430 is connected to atmosphere through the passage 439. Chamber 431 is connected to atmosphere through a passage 407 which may be restricted or closed by a screw 408. Chamber 431 is also connected with chamber 425 through a restricted passage 410 and passages 403 and 402, and, is connectable with chamber 426 through the restricted passage 410 and passages 403 and 404.

The central portion of the upper central section 421 is bored as at 440 for receiving a bushing 441. The lower central portion is concentrically bored to receive a piston type valve 461. The valve 461 includes an upper head portion 463 and a lower head portion 464 connected by a neck portion 465. The neck portion 465 is disposed within the bushing 441. The neck portion 465 and the bushing 441 cooperate to provide a valve chamber 462. Valve chamber 462 is connected by a side passage 471 and tube 453 with the upper chamber 36 of the main valve actuator 432. A restriction, in the form of an adjustable screw 474, is interposed between the pipe 453 and the chamber 36 for controlling the rate of flow of air between said tube and chamber and between said chamber and tube. The lower portion of bore 440 in section 421 forms a valve chamber 411 which is connected by a passage 412 and tube 414 to the duct 21, to the right of main valve 424.

As in the other views, the air flows through tube 21 from right to left. In Fig. 8, the main valve 424 is in the form of a damper which is actuated by diaphragm 31 through rod 428 and a link 429. Like in Fig. 2, spring 42 urges the diaphragm upwardly to close or substantially close the damper 424. In this embodiment, the chamber 37 is formed by the diaphragm 31 and the lower section 434; this section is open to atmosphere through a passage 416.

If the stoker and blower have been idle for sometime, valve 424 will be closed or substantially closed, and, when the stoker and blower start, pressure will immediately develop in the inlet end of duct 21. Air will flow through tube 414, passage 412, valve chamber 411, valve chamber 462, passage 471, tube 453, past the restriction offered by screw 474 to the upper chamber 36 of the main valve actuator 432, since this air flow is restricted, valve 424 will open slowly causing a gradual increasing flow of air in duct 21 and through Venturi 473.

As the flow of air through the Venturi tube 473 increases, an increasing pressure differential will develop between passage 438 and tube 444 and between chambers 426 and 425. When this pressure difference becomes sufficient, the upward force acting against diaphragm 423, will overcome the resistance of biasing spring 467 and the valve 461 will be moved upwardly a sufficient amount to stop the flow of air to the chamber 36 of the main valve actuator 432. When this occurs, further opening of the main valve 424 and further increase in the flow of air through duct 21 and Venturi 473 will be stopped. Since both chambers 430 and 431 are open to atmosphere, the small amount of air flowing through restricted passage 410 to chamber 431, will have no appreciable effect in raising the pressure in chamber 431 and the movement of the valve 461 will be substantially unaffected by forces acting on diaphragm 427. Since chambers 426 and 425 are equally affected by changes in static pressure, the relay will regulate the flow of air through duct 21 in response to changes in fuel bed resistance so as to maintain a constant pressure differential between passage 438 and tube 444. This will result in maintaining a relatively constant flow of air within the capacity of the blower, independently of changes in fuel bed resistance.

When the adjusting screw 405 closes passage 404, the relay operates to deliver a minimum volume of air to the fuel bed. By partially opening adjusting screw 405, some air from tube 403 will be admitted to chamber 426 through passages 403 and 404, and, since restricted passage 401 limits its flow to passage 438, the pressure in chamber 426, instead of being the same as that in passage 438, will be somewhere between that of the pressure in passage 438 and at tube 444. Consequently, a greater volume of air will be required to flow through Venturi 473 to produce the pressure differential between the chambers 426 and 425, which is required to bring valve 461 to the position stopping the movement of the main valve 424. Different degrees of opening of adjusting screw 405, will provide for adjusting the relay to maintain the desired rate of air flow. That is, the volume of air flowing through the tube can be adjusted by means of screw 405.

If the adjusting screw 408 is closed, the pressure in chamber 431 will correspond to the static pressure in duct 21, the chamber being in communication with said duct through restricted passage 410, passages 403, 402 and tube 444. With screw 408 closed, diaphragm 427 will then affect the operation of the valve 461 in the same manner that pressure vane 73 of Fig. 2 affects the operation of valve 61, in that the relay 455 will regulate the flow of air through duct 21 to give an increase in volume with an increase in fuel bed resistance and a decrease in volume with a decrease in fuel bed resistance.

By partially opening adjusting screw 408, the pressure in chamber 431 can be adjusted to any desired point between that in duct 21 and the pressure of the atmosphere. In this manner, the effectiveness of diaphragm 427, on the operation of valve 461, can be adjusted to any desired degree. Also, by varying the tension of spring 467, the relay can be adjusted to regulate the volume with respect to the pressure required to produce the flow to any desired rate from volume equals the constant to very near to volume equals the square root of the pressure times the constant. If desired, the connections to chambers 430 and 431 could be interchanged and the relay could then be adjusted to deliver a fluid flow decreasing at any desired rate as the resistance to the flow increases.

By adjusting the various simple controls, the relay 455 can be used to regulate the fluid flow, with respect to resistance to flow, at any desired rate over a wide range, because it is not necessary for the velocity through Venturi 473 to be high enough for the pressure in passage 438 to drop below that of atmospheric for the relay to function at a lower rate of flow through Venturi 473, as that required through Venturi 373 of the relay shown in Fig. 7.

In the embodiment illustrated in Fig. 9, the main valve 524 is operated directly by the apparatus which is responsive to static pressure and velocity of the air flowing in the duct 21. Like in Fig. 8, the main valve 524 is in the form of a damper, which is pivotally mounted at 501 and is actuated by a lever 502 and a link 529. A counterweight 504 is adjustably mounted upon the lever 502 to counterbalance the link 529.

The static pressure-velocity responsive apparatus 555 is carried on the top of duct 21 by brackets 505 and 506. Apparatus 555 includes two stationary bellows members 508 and 509 which are vertically spaced from one another. A common wall 511 is interposed between members 508 and 509 and is pivotally mounted upon bracket 505 at 512. Flexible end wall 513, end wall 514 and side walls 515, one of the latter of which only is shown, cooperate with bellows member 508 and the movable wall 511 to provide a bellows chamber 516. Flexible end wall 518, end walls 519, and side walls 520, one of which only of the latter is shown, cooperate with the bellows member 509 and the movable wall 511 to provide a bellows chamber 521. The movable wall 511 is connected to link 529 and the movement of said wall causes the movement to be imparted to the main valve 524. It will be observed that chamber 521 is shorter than chamber 516 whereby the pressure area of bellows chamber 521 upon the movable wall 511 is less than the pressure area of bellows chamber 516 on said movable wall.

An impact tube 573 is located in the top of duct 21, with its open end facing the intake end of said duct and is in communication with bellows chamber 521. A pressure tube 577 is also disposed in duct 21. The end of this tube is closed and is provided with an opening 523 in a side wall thereof so that it faces the side of duct 21. Tube 577 is connected with the interior of bellows chamber 516. As is well known in the operation of Pitot tubes, the impact tube will maintain a pressure in bellows chamber 521 substantially equal to the static pressure in duct 21, plus the pressure produced by the flow of air past the impact tube. This rise in pressure produced by the flow of air past impact tube 573, is substantially proportional to the square of the velocity. Pressure tube 577 will maintain a pressure in bellows chamber 516 substantially equal to the static pressure in duct 21.

A volume adjusting damper 585 is mounted in duct 21 below the tubes 573 and 577. When this damper 585 is rotated counterclockwise to substantially a vertical position, substantially all the air flowing through duct 21 flows above the damper and causes a much greater velocity of air flow past impact tube and pressure tube than the average velocity in duct 21. Obviously, the velocity of the air passing over tubes 573 and 577 can be varied by varying the position of the damper 585 and when the damper is in a substantially horizontal position, the velocity of the air flowing past said tubes is nearly the average velocity in duct 21.

When the stoker is idle and the pressures in bellows chambers 516 and 521 are at atmospheric pressure, the main valve 524 is in a substantially horizontal position, that is, the weight 504 is adjustably set so that it does not quite counterbalance the other movable parts of the mechanism. When the stoker and blower are started, main valve 524, being open, the air flows in duct 21 will quickly rise toward a maximum. While the rate of flow increases, as previously explained, the pressure difference between bellows chambers 516 and 521 increases and, when it has reached a sufficient differential, this difference acting upwardly on the movable wall 511, will overcome the downward pressure in bellows chamber 516. This will cause the main valve 524 to be rotated counterclockwise, reducing the flow of air through duct 21. The reduction in velocity of the air will continue until the pressure difference between bellows chamber 516 and bellows chamber 521, acting on movable wall 511, will just balance one another.

If the fuel bed resistance varies, the rate of flow of air will be varied. For example, if the fuel bed resistance increases, the static pressure in bellows chambers 516 and 521 will be increased and the pressure increase in bellows chamber 521, due to air flowing past impact tube 573, will be decreased, causing the main valve 524 to be moved clockwise to increase the flow of air to duct 21. Conversely, if the fuel bed resistance is decreased, the pressure in bellows chambers 516 and 521 will be decreased and the pressure increase in bellows chamber 521 due to air flowing past impact tube 573 will be increased to cause the movable wall 511 to rotate the main valve 524 in a counterclockwise direction to decrease the flow of air flowing through duct 21. As previously explained, the position of damper 585, determines the relationship between the velocity of flow past impact tube 573 and pressure tube 577, and the average flow through duct 21 and therefore by regulating the position of damper 585, the thickness of the fuel bed can be controlled. The pressure area of bellows chamber 521 has been made slightly smaller than the pressure area of bellows chamber 516, acting on movable wall 511 so as to give the desired rate of change of flow in change of fuel bed resistance. It will be understood that the pressure areas can be increased or decreased if other rates of change of flow are desirable by selecting the proper sized bellows.

The apparatus shown in Fig. 9 can be used in installation where a high degree of sensitivity is not material, and, where a high sensitivity is necessary, it is preferred to utilize one of the other embodiments of the invention in which the static pressure-velocity responsive apparatus functions merely as a relay.

From the foregoing disclosure, it will be seen that novel and simple means have been devised for regulating the flow of a fluid in which the rate of flow of the fluid is changed in response to increase or decrease to the resistance of the flow, and, that these means can be easily adapted to regulate this increase or decrease in flow with increase or decrease in resistance at any desired rate from approximately a constant flow up to near the theoretical limit of volume equals the square root of pressure times the constant.

While the forms of embodiments of the present invention as herein disclosed constitute preferred forms, it is to be understood that other forms might be adopted, all coming within the scope of the claims which follow.

I claim:

1. In a system wherein fluid is supplied under pressure to a pervious substance whose resistance varies, the method of supplying fluid to the substance at increasing and decreasing static pressures in response to increase and decrease, respectively, of the resistance offered by the substance, which method consists in: (1) When the resistance of the substance increases and thereby effects an increase in the static pressure and effects a decrease in the volume of the fluid flowing to the substance, the step of increasing the static pressure of the fluid, flowing to the substance, by adjusting the aforesaid system to supply fluid at such an increased pressure that the rate of flow to the pervious substance is greater than before the increase in resistance of said substance; and (2) when the resistance of the substance decreases and thereby effects a decrease in the static pressure and an increase in the dynamic pressure and effects an increase in the volume of the fluid flowing to the substance, the step of decreasing the static pressure of fluid, flowing to the substance, by adjusting the aforesaid system to supply fluid at such a decreased pressure that the rate of flow to the pervious substance is less than before the decrease in resistance of said substance.

2. In combination, a fluid duct; a pump connected to said duct for forcing fluid therethrough; a modulating valve having an adjustable passage connected with the aforementioned duct for controlling the flow of fluid; expansible chamber motivating mechanism comprising a diaphragm having a first upper chamber on one side thereof and having a second lower chamber on the opposite side thereof, said mechanism being connected to said modulating valve; means biasing said modulating valve toward a position where the passage thru it is closed; the second chamber of said motivating mechanism, which when expanding reduces the passage thru the modulating valve, being connected to the inlet side of said pump; a fluid passageway connecting both the first chamber of the motivating mechanism and thru a restricted passage the inlet side of said pump to said duct adjacent the pump; a relay valve in said fluid passageway and biased to an open position to provide communication between said duct and the first chamber of said motivating mechanism and to the inlet of the pump in the aforesaid manner to provide pressure in said first chamber to cause the expansible chamber motivating mechanism to enlarge the passage thru said modulating valve; a relay valve moving mechanism in said control circuit including a device biasable in one direction by the difference of force between two sources of pressure, one of said sources of pressure being the static pressure in said duct and the other being atmospheric pressure, said static pressure in said duct tending to overpower the biasing effect of the atmospheric pressure on said relay valve to close said relay valve, and means connected to said device and extending into said duct responsive to the dynamic flow thru said duct to move said device to close said relay valve and cut off the pressure in said duct from said first chamber of the motivating mechanism and to the inlet of the pump in the aforesaid manner, whereby the size of the passage thru said modulating valve will be reduced by the expansible chamber motivating mechanism.

3. In a furnace system wherein air is supplied under pressure to a fuel bed whose resistance to the flow of air varies, the method of regulating the volume of air supplied to the fuel bed, which consists in: (1) Adjusting the air pressure supplying means so that the volume being supplied to the fuel bed is such that, according to a predetermined ratio, it is substantially proportional to the square root of the sum of the pressure producing the flow through the fuel bed and a predetermined force factor; (2) When the resistance of the fuel bed increases thereby reducing the volume of air supplied to the fuel bed, adjusting the air pressure supplying means to supply air at an increasing pressure and volume until the volume being supplied to the fuel bed is again such that, according to the predetermined ratio, it is substantially proportional to the square root of the sum of the pressure producing the flow through the fuel bed and the predetermined force factor at a higher level of volume and pressure; (3) When the resistance of the fuel bed decreases thereby increasing the volume of air supplied to the fuel bed, adjusting the air pressure supplying means to supply air at a decreasing pressure and volume until the volume being supplied to the fuel bed is again such that, according to the predetermined ratio, it is substantially proportional to the square root of the sum of the pressure producing the flow through the fuel bed and the predetermined force factor at a lower level of volume and pressure.

4. In a fluid supply system wherein fluid is supplied under pressure to a means whose resistance to the flow of fluid varies, the method of regulating the volume of fluid supplied to the means, which consists in: (1) When the means offers increasing resistance to the flow of fluid, regulating the fluid supply system to supply fluid at such a progressively increasing pressure that the fluid is caused to flow thru the means at a progressively increasing volume as resistance to flow increases; (2) When the means offers decreasing resistance to the flow of fluid, regulating the fluid supply system to supply fluid at such a progressively decreasing pressure that the fluid is caused to flow thru the means at a progressively decreasing volume as resistance to flow decreases.

5. In an apparatus for controlling the flow of air in a furnace having a duct through which said air flows, a fuel bed to which said air flows from said duct, a blower by which air is driven through said duct, and a damper by which the amount of air supplied by said blower is regulated, in combination therewith the improvement which consists of a control mechanism comprising means for sensing the static pressure in said duct; damper operating means operated by said sensing means for moving said damper towards an open position in response to increases in said static pressure and for allowing the movement of said damper towards a closed position in response to decreases in said static pressure; and means for sensing the dynamic pressure in said duct and responsive to velocity of air passing through said duct for opposing the operation of said damper operating means in opening said damper and aiding the operation of said damper operating means in moving said damper towards a closed position, the force developed by said means being a function of the velocity of air in said duct; whereby the force produced by the static pressure within the duct is opposed by the force produced by the volume or rate of flow of air through the duct and whereby the volume of flow of air through the duct is caused to be increased with increases in the resistance to flow offered by the fuel bed and is caused to be decreased with decreases in the resistance to flow offered by said fuel bed.

References Cited in the file of this patent

UNITED STATES PATENTS

| | | |
|---|---|---|
| 930,158 | Connet | Aug. 3, 1909 |
| 1,173,404 | Austin et al. | Feb. 29, 1916 |
| 1,474,754 | Adams | Nov. 20, 1923 |
| 1,522,877 | Gibson | Jan. 13, 1925 |
| 1,713,833 | Kochendorfer | May 21, 1929 |
| 2,109,239 | Scholl | Feb. 22, 1938 |
| 2,233,047 | Bressler | Feb. 25, 1941 |
| 2,259,119 | Stoehr | Oct. 14, 1941 |
| 2,353,201 | Talbot | July 11, 1944 |
| 2,374,708 | Shoults | May 1, 1945 |
| 2,441,845 | Robinson | May 18, 1949 |